UNITED STATES PATENT OFFICE.

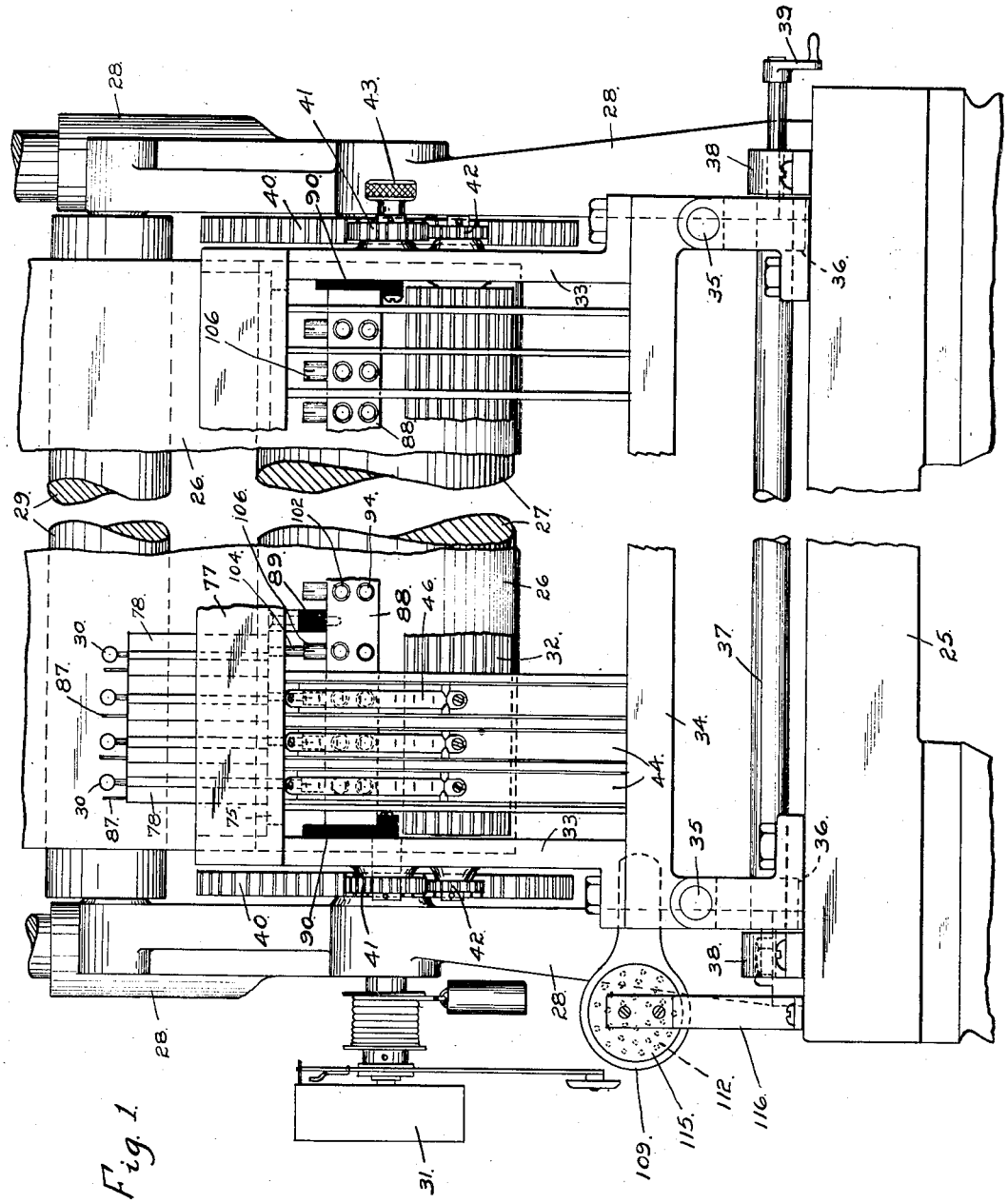

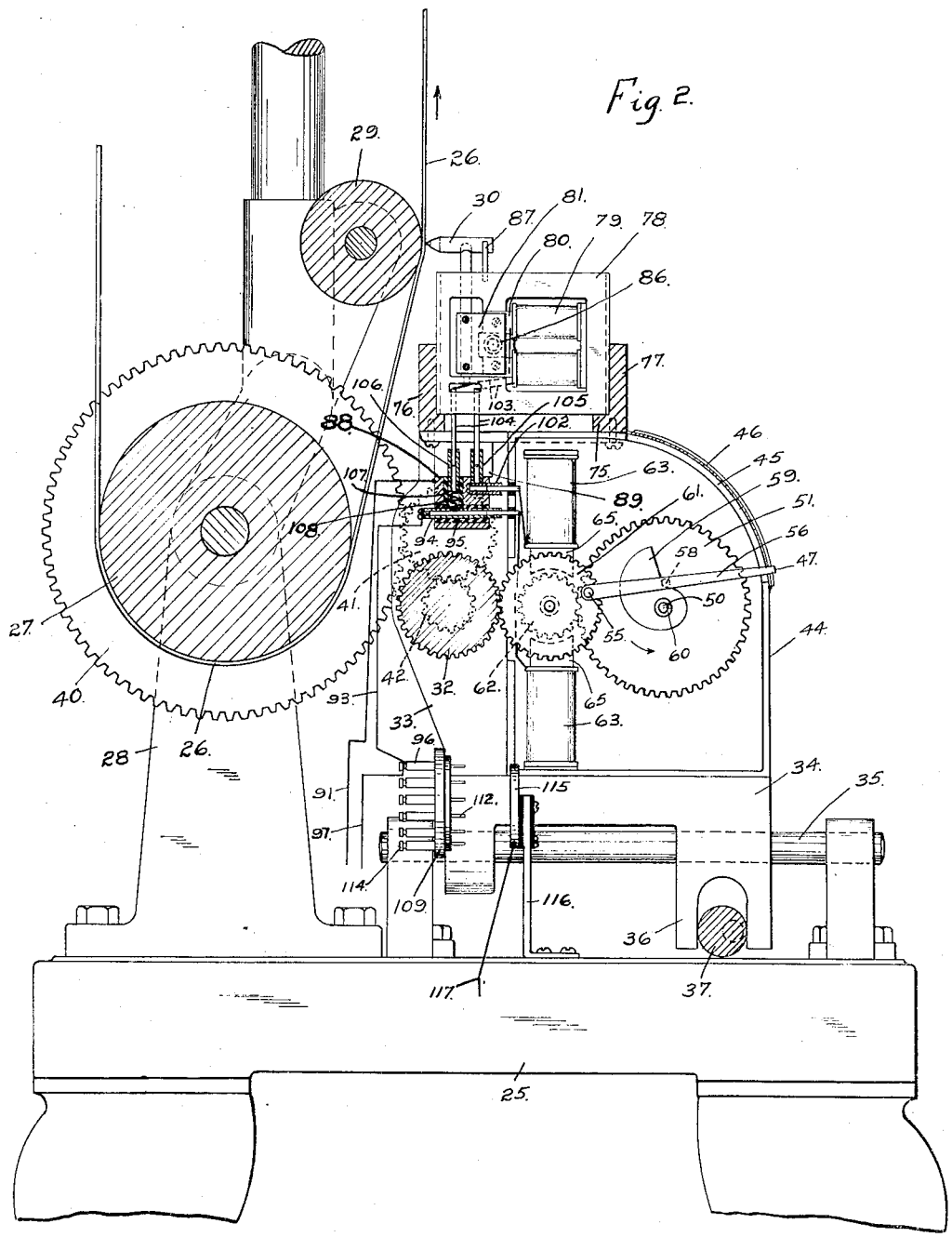

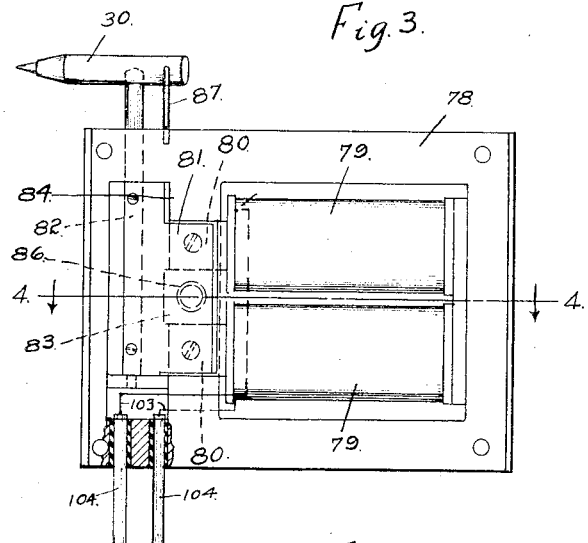

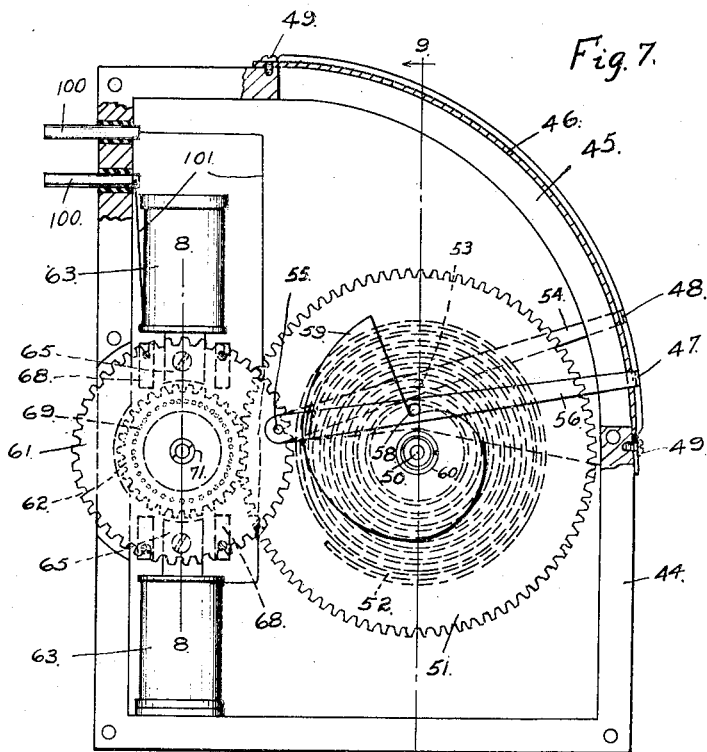
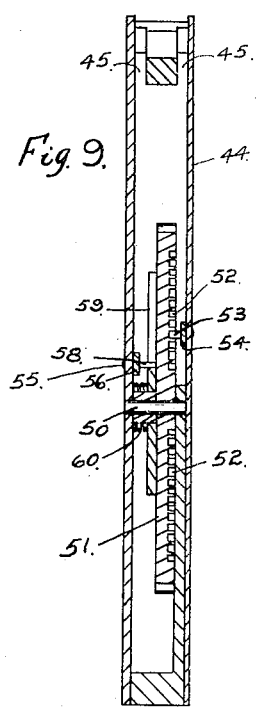
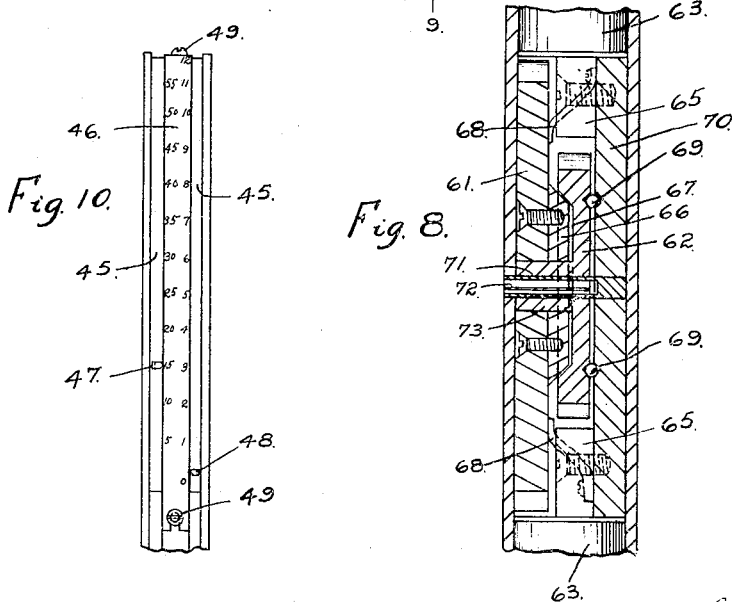
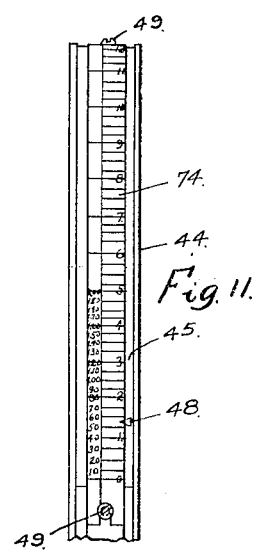

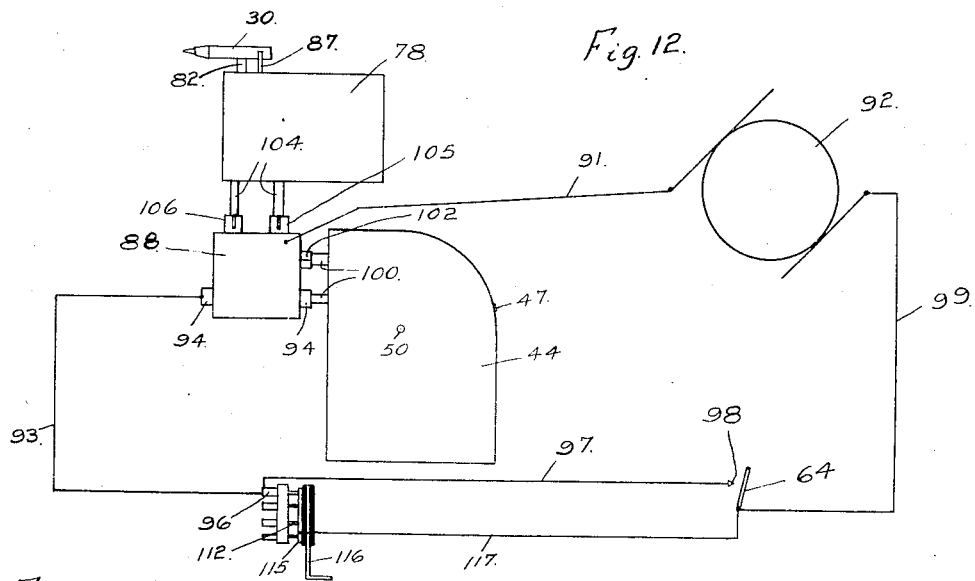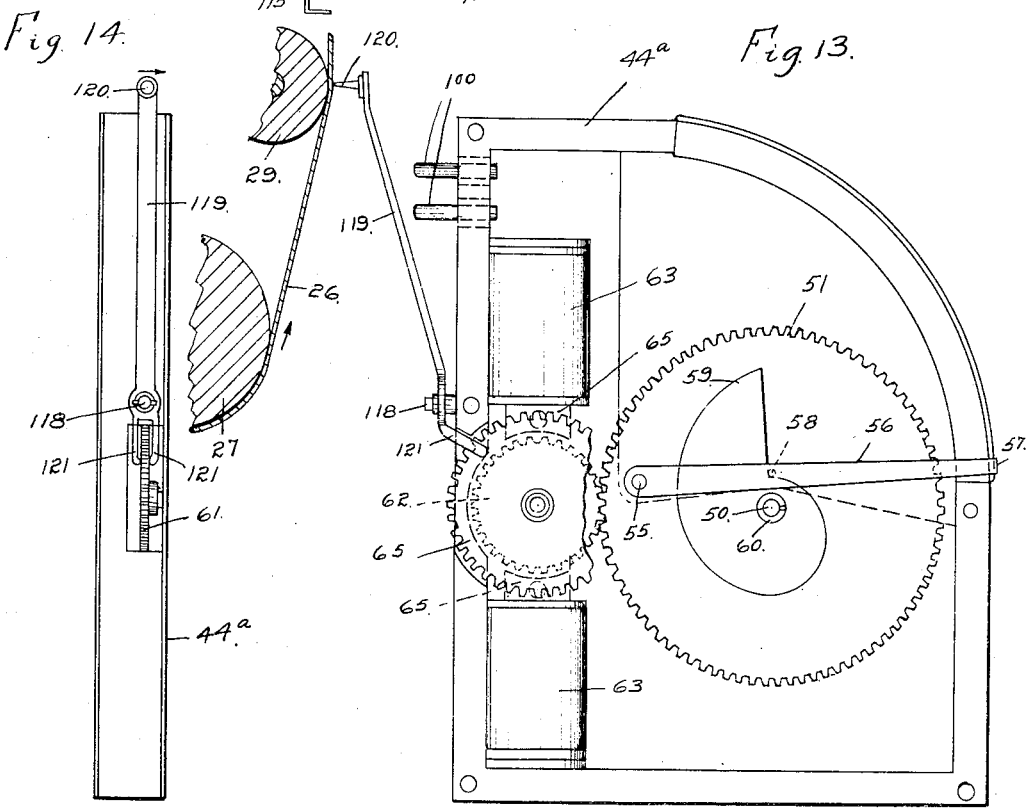

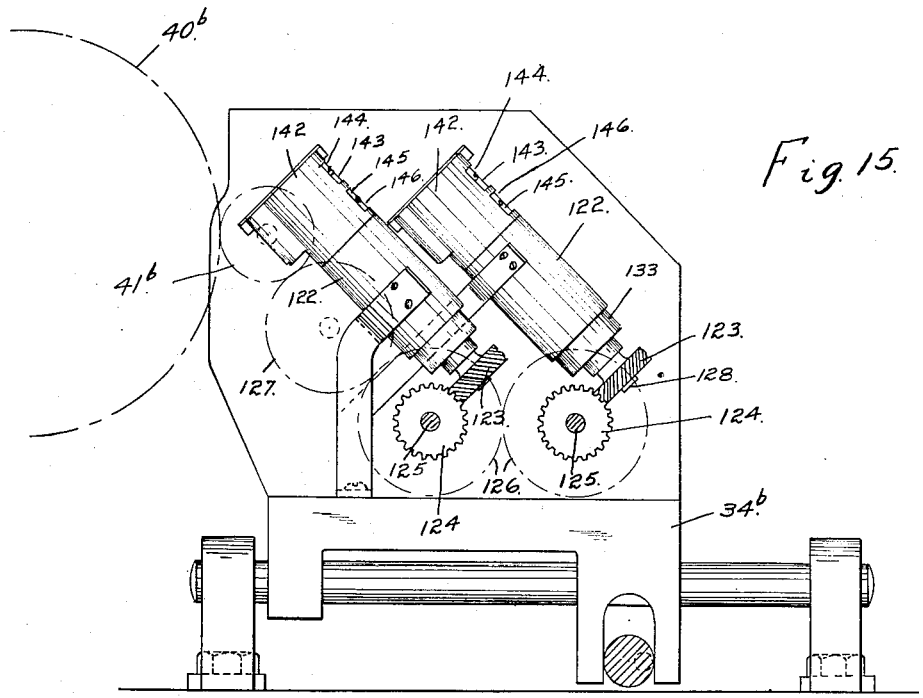
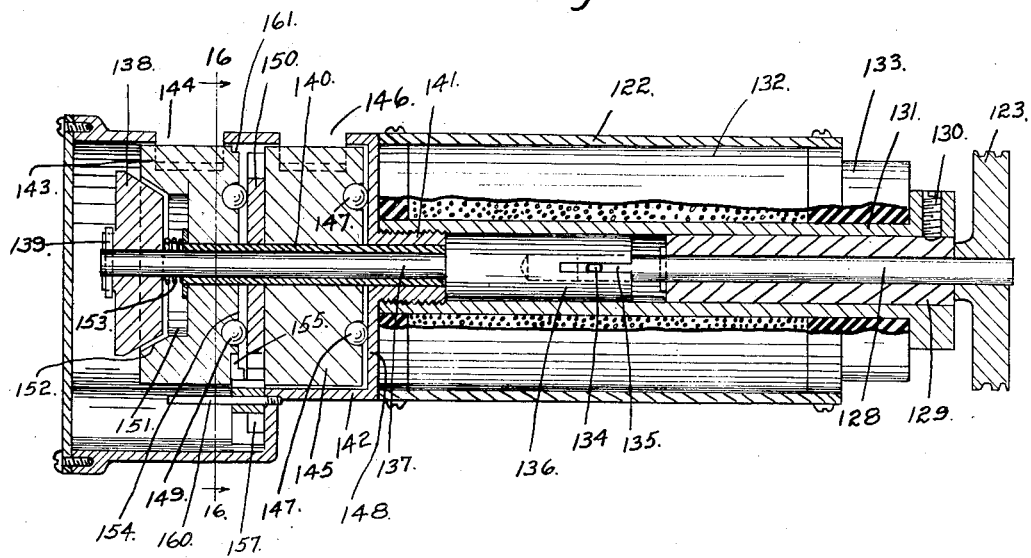

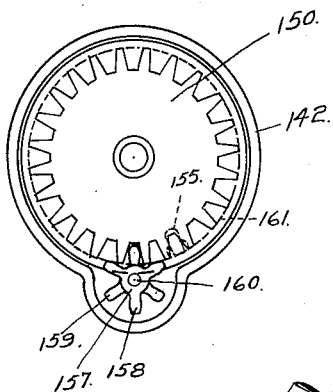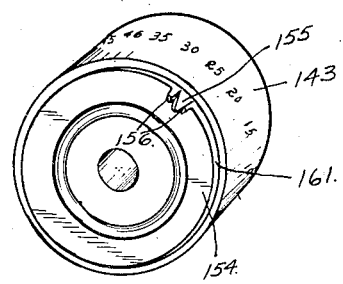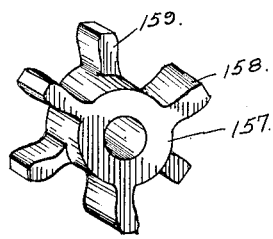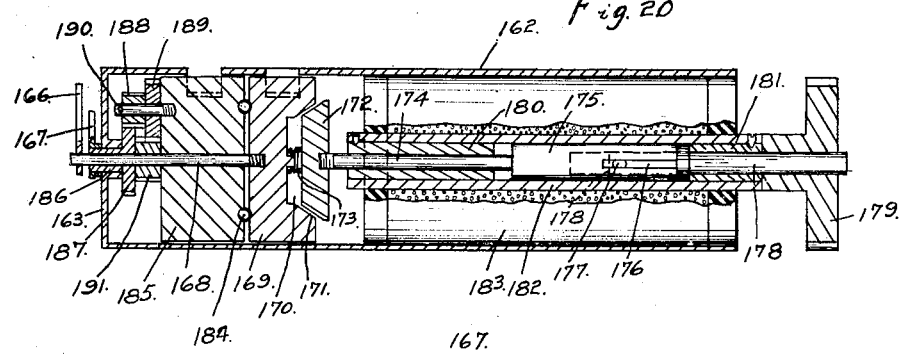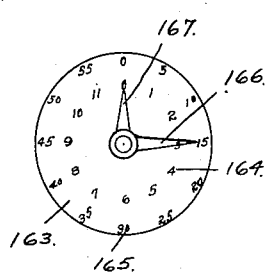

AUSTIN C. JOHNSON, OF CHICAGO, ILLINOIS, ASSIGNOR TO PRODUCTION METER COMPANY, OF CHICAGO, ILLINOIS, A CORPORATION OF DELAWARE.

INDICATING AND RECORDING MECHANISM.

1,283,789.  Specification of Letters Patent.  Patented Nov. 5, 1918.

Application filed May 18, 1914. Serial No. 839,294.

*To all whom it may concern:*

Be it known that I, AUSTIN C. JOHNSON, a citizen of the United States, residing at Chicago, in the county of Cook and State of Illinois, have invented certain new and useful Improvements in Indicating and Recording Mechanisms, of which the following is a specification.

My invention relates to an apparatus for giving a visual indication and also, if desired, making a permanent record of the performance of a machine or a plurality of machines, in order, for example, to enable the superintending officer of a factory to keep accurate account of the operation of the several machines in the factory and for the purpose, if desired, of basing the compensation of the workmen upon the time during which the machines under their control are in actual operation. An apparatus of this sort is disclosed in my pending application Serial No. 719,937 filed September 12, 1912. The invention herein shown and described provides certain improved devices, constructions and arrangements for an indicating and recording machine of this character with the object of simplifying the mechanism and making its operation more accurate and reliable. In an apparatus for recording temporarily or permanently, or both, the performance of another machine, perfect accuracy and reliability are essential particularly if the record is to be used as the basis for the pay of the workman and if the active periods of the machine whose operation is the subject of the record, are frequent and of short duration. If such recording apparatus is used in a large factory to give indication of the performance of a large number of machines it is very desirable that the units of the recording apparatus should be compact, so that the apparatus should not be too bulky for the superintendent's office, and that they should be readily removable so that a single unit may be taken out for repair without affecting the operation of the other units. It is also essential that the visual indicating means be capable of being all set back to zero at the end of the day, for example, by a single operation. My invention provides an indicating and recording apparatus which, in these several respects and in other respects as will be apparent from the following description, is an improvement upon any of the recording and indicating machines of this class which have heretofore been put into service.

The invention is illustrated, in certain preferred embodiments, in the accompanying drawings wherein—

Figure 1 is a front elevation of one type of machine constructed in accordance with the invention;

Fig. 2, an end elevation of the same with certain parts removed so as to show the construction of one of the indicating units;

Fig. 3, an enlarged view, in elevation with a part in section, of one of the marker units shown in the preceding figures;

Fig. 4, a sectional plan taken on line 4—4 of Fig. 3;

Fig. 5, a detail view of a contact supporting plate the contact elements of which come into play when the visual indicating units are set back to zero;

Fig. 6, a fragmentary sectional view on line 6—6 of Fig. 5;

Fig. 7, a longitudinal sectional view illustrating the construction of one of the visual indicating units;

Figs. 8 and 9, sectional views taken on lines 8—8 and 9—9 respectively, of Fig. 7;

Fig. 10, a detail view, in elevation, of the indicating dial divided so as to show the performance of a machine computed in minutes and hours;

Fig. 11, a similar view of a modified form of dial graduated so as to compute the duration of the operation of the machine in hours and fractions of hours and at the same time the compensation of the workmen based upon a certain rate per hour;

Fig. 12, a schematic view showing the electrical circuits of the apparatus shown in the previous figures;

Fig. 13, a longitudinal sectional view of a modified form of unit which provides both the visual indication and also the permanent record;

Fig. 14, a view of the back or inner edge of the unit with the casing removed;

Fig. 15, an end view, somewhat diagrammatic in character, showing a modified form of indicating unit and certain necessary modifications in the mechanism for actuating units of the modified type;

Fig. 16, a longitudinal sectional view taken through one of the units shown in the preceding figure;

Figs. 17, 18 and 19, detail views of the indicating wheels and related mechanism forming part of the modification shown in Figs. 15 and 16; Fig. 17 being a view, in perspective, of the minute wheel, Fig. 18 a view, in elevation, of the gear on the hour wheel, and Fig. 19, a view, in perspective, of the mutilated pinion which transmits the movement of the minute wheel to the hour wheel.

Fig. 20 is a longitudinal sectional view of another modified form of indicating unit, and Fig. 21, a view of the dial of this unit.

Like characters of reference designate like parts in the several figures of the drawings, Referring first to Figs. 1 to 12 inclusive, 25 designates a base on which the apparatus is mounted, 26 the chart on which the permanent records are made, this chart extending around the lower drum 27 journaled on standards 28, and an upper drum (not shown). An idler roller 29 is provided over which the chart passes and the marker 30 is brought to bear against the chart at this point. The drum 27 is preferably rotated uninterruptedly by some suitable motor. I have shown diagrammatically at 31 a clock movement for driving the roller.

The visual indicating units are individually separable from the rest of the machine and are each provided with driving trains actuated from a single cylindrical element 32 formed with gear teeth. This element is journaled on standards 33 on a slide 34 mounted on guide rods 35 on the base 25 and formed with depending forks 36 to receive an eccentric rod 37 mounted in bearings 38 on the base 25 and provided with a handle 39. By means of the eccentric 37 the slide 34 may be moved to and from the drum 27. The latter is provided at one, or preferably at each end, with a gear wheel 40 adapted to mesh with a gear wheel 41—when the slide 34 is in its inner position, the position shown in Fig. 2—the gear 41 meshing with a gear 42 rigidly connected with the cylindrical gear 32. One of the gears 41 is formed with a knob 43 which is used for resetting the visual indicating means as will be hereinafter described.

Each visual indicating unit is housed in a thin casing 44 (Figs. 7, 8 and 9), the front edge of which is formed on a curve and is provided with an opening 45 over which extends a curved dial strip 46 arranged to leave slots on opposite sides of the strip for the minute pointer 47 and hour pointer 48 (Fig. 10), the dial being secured to the casing by screws 49. Mounted within the casing on the pivot 50 is an accumulator gear wheel 51 formed on one side with a spiral slot 52 in which travels a pin 53 on an arm 54 pivoted at 55 to the casing 44 with its other extremity turned over to form the hour pointer 48 above referred to. The hour graduation of the dial 46 corresponds with the configuration of the spiral slot 52 so that each revolution of the accumulator wheel 51 raises the pointer 48 the space of one hour graduation of the dial. The minute pointer 47 is formed on the end of an arm 56 pivoted at 57 to the casing 44 and provided with a pin 58 which rests upon a snail cam 59 which is pressed against the accumulator wheel 51 by a spiral spring 60. The frictional engagement of the snail cam with the accumulator wheel causes the former to rotate when the latter is driven. One revolution of the accumulator wheel recording in the aggregate an hour's operation of the machine with which the unit is connected carries the minute pointer from the bottom to the top of the minute scale. When the hour is complete the pin 58 drops down to the low point of the cam and is then in position to give indication of the minute periods of the next hour.

The accumulator wheel 51 is driven from the long cylindrical gear 32 by means of a constantly driven gear 61 and a gear 62 which are clutched together through the agency of a pair of electromagnets 63 which are energized by the closing of a switch 64 (Fig. 12). The switch 64 is operated by the machine the performance of which the unit in question serves to indicate, the switch being closed at the commencement of an operative movement of the machine or of the piece of work through the machine and is opened again when said operative movement ceases or when the piece of work leaves the machine. For example, if the unit is employed for giving indication of the performance of a planer the switch may be arranged so as to be closed when the board or other article on which the planer operates starts to move through the machine and open again when the board leaves the machine. It will be understood that this is simply one example of the applicability of the indicating and recording apparatus of my invention. The apparatus may be employed in other situations. The magnets 63 are formed with pole pieces 65 which lie adjacent the gear wheel 61. The latter is made of steel or other magnetizable metal and is provided on the face adjacent the gear 62 with a conical clutch member 66 engaging with a similarly formed depression 67 in the gear wheel 62, the latter being made of brass. The clutch faces on the gears 61 and 62 are normally kept out of contact with each other by means of springs 68 which bear against the gear 61. In order to insure perfect freedom of movement of gear 62 a ball bearing 69 is interposed between the gear 62 and the plate 70 on which the gears are mounted; and in order that there should be no lost motion in the mechanism the gears 61, 62 are mounted on a hollow pivot 71 which is formed with longitudinal slits 72. The portion of metal between such slits provides spring fingers which exert a constant pressure against the gear wheel 62 and the boss 73 formed thereon, upon which gear 61 rotates, which prevents the loss of any motion between gear 61 and the accumulator wheel 51 and also prevents any accidental movement of the gear 62 due to the frictional engagement of its hub 73 with the constantly driven gear 61. This is an important point in an apparatus of this character in which the indicating train is actuated intermittently and usually at short intervals, since even a very slight loss of motion at each actuation would give rise to a considerable discrepancy in the accumulated total.

It will be understood that the indicating unit above described is one of a number of such units which severally record the performance of a number of different machines. Each unit is self contained and removable from the apparatus for repair. When in place in the apparatus the gear 61, in each case, meshes with the long cylindrical gear 32 which is constantly driven, as above described, so long as the slide 34 is in its inner position with gears 41 meshing with the gears 40 on the shaft of roller 27.

The indicating unit just described gives an indication of the aggregate total of the operation periods of the machine, the performance of which is recorded, in minutes and hours. In Fig. 11 I have shown a modification comprising a dial 74, the graduations on the right side of which represent hours and fractions of an hour and those on the left the corresponding amounts of money payable to the operator of the machine at a fixed rate per hour. When the unit is provided with a pay-roll dial of this sort (a number of dials being supplied in which the wage computation is at different rates per hour) the hour pointer 48 alone is used, the minute pointer 47, its lever 56 and the snail cam 59 being omitted.

The apparatus, as shown, is provided with a series of removable marking units which correspond respectively with the visual indicating units just described and serve the function of making a permanent record on the chart 26 of the performance of the machines of which the indicating units give visual indication. The marking units are supported upon a shelf 75 carried on the upright supports 33 which is provided with retaining strips 76, 77. Each unit comprises a frame 78 supporting a pair of electro-magnets 79 provided with pole pieces 80. The armature 81 of the magnets is secured to a shaft 82, revolubly mounted in the frame 78, which shaft carries the marker 30 referred to above. The center portion 83 of the web 84 of the casing extending back of the pole pieces 80 projects outwardly a trifle beyond the faces of the pole pieces and is formed with a pocket 85 for a spiral spring 86 which bears against the armature 81. When the magnets are energized the armature is attracted toward the pole pieces 80 and this movement rocks the marker into contact with the chart 26. When the magnets are deënergized the spring 86 forces the armature away from the pole pieces. As it does not come into actual contact with the pole pieces there is no danger that the magnet in the coils will cause the armature to stick. When in the idle position the marker rests against a stop pin 87. The electro-magnets of each marker are on the same circuit with the electro-magnets of the corresponding visual indicating unit. The electrical connections for any given pair of units are as follows: 88 designates a contact strip which extends the whole length of the apparatus, being secured to an insulating block 89 on the under side of the shelf 75 and supported at the ends on insulating blocks 90 secured to the uprights 33 (see Figs. 1 and 2). The contact strip is connected by a wire 91 (Fig. 12) with the generator 92. A wire 93 is connected with a tubular element 94 extending through the contact strip 88 but insulated therefrom by an insulating sleeve 95, the wire 93 extending to a plug 96 suitably mounted on the slide 34 as will be hereinafter described. A wire 97 extends from a plug 96 to one of the points, 98, of a switch 64, the other point of which is connected by a wire 99 with the generator. The switch 64 is controlled by or in accordance with the movements or operation of the machine the performance of which the units in question record. The visual indicating units are provided with contact plugs 100 with which the magnet circuit 101 within the casing of the unit is connected, one of these plugs entering a tubular contact member 102 forming electrically a part of the contact strip 88, the other entering the end of the insulated tubular contact element 94 above referred to. The magnet circuit 103 of the marking unit is connected with contact plugs 104 extending through the framework 78 (Figs. 2 and 3). When the unit is put in place on the shelf 75 the end of one of the plugs 104 enters a tubular contact element 105 on the contact strip 88, the other plug 104 entering a similar tubular element 106 which is mounted in the strip but is insulated therefrom by a sleeve 107. The tubular contact element 106 is electrically connected with the tubular contact element 94 by a spiral spring 108.

In order to set all of the indicating units back to zero the slide 34 is moved outwardly, which takes gears 41 out of mesh with the fixed gears 40, and the re-setting knob 43 turned backwardly. This reverses the movement of the train consisting of gears 41, 42, the long cylindrical gear 32 and the gear 61 of the unit unless, however, the magnets 63 are energized so as to clutch gear 62 to gear 61, the indicating pointers are not moved. In order to insure the simultaneous energization of the magnet 63 of each unit of the machine without manipulating the several switches 64, the following arrangements are provided: An insulating block 109 (Figs. 1, 2, 5, 6 and 12) is secured to the slide 34 which is formed with apertures 110 for the several contact plugs 96 previously described. These plugs are cylindrical in form and contain, in each case, a plunger 111 provided with a contact rod 112, a spiral spring 113 being interposed between the plunger and a screw binding post 114 to which the wires 93, 97 are secured. It will be understood that the circuit connecting the electro-magnet of each pair of units—through the tubular member 94—with its respective controlling switch 64, is connected in this manner to one of the plugs 96 on the insulating block 109. 115 designates a contact plate supported upon but insulated from a bracket 116 on the base 25 in such position that the several elastically sustained contact rods 112 will be brought against the same when the slide 34 is moved outwardly to disengage the driving trains of the indicating units from the fixed gears 40. Wires 117 connect each of the wires 99, across the switches 64, with the contact plate 115. As a result, when the part of the apparatus supporting the several units is moved out of operative relation with the stationary part of the apparatus the magnets of the several units are energized regardless of whether the switches 64 are opened or closed; with the result that the gear wheels 62 are clutched to their respective gear wheels 61, permitting the reversal of the trains controlling the indicating pointers. If at the time of re-setting the pointers in the different units are in different positions, as is likely to be the case, no difficulty is experienced because after the pointers of a given unit have reached the zero position the clutch member 66 will slip, since its hold on gear 62 is only frictional and the magnetic attraction of magnets 63 need not be very strong in order to operate the mechanism of the unit.

It will be understood that if desired the chart 26 and the marking units might be omitted from any given apparatus provided a permanent record of the performance of the machines of the factory is not required. If the system of making a permanent record is retained the marking devices might be operated in each case by the mechanism of the corresponding indicating unit, as shown in the modification illustrated in Figs. 13 and 14, instead of having the markers consist of separate, magnetically operated units as previously described. The unit shown in Figs. 13 and 14 is constructed exactly like the indicating units previously described with the addition that the casing 44$^a$ of the modified form of unit has pivoted thereto on the pivot post 118 a marker arm 119 carrying a stylus or marker 120, the arm 119 terminating at its lower end in a fork 121 which straddles the gear 61 so that when the gear is attracted toward and clutched to the gear 62, as previously described, the arm 119 is rocked so as to bring the stylus 120 into contact with the chart 26.

The operation of the apparatus, having reference to any one of the several visual indicating units with its corresponding marking unit, is as follows: The roller 27 is constantly rotated by the clock-work mechanism 31 imparting to the chart 26 travel in the direction of the arrow shown in Fig. 2. This drives gears 40, and also, if slide 34 is in its inner position, the train consisting of gears 41 and 42, the long cylindrical gear 32 and the steel gear 61 of the unit. The magnets 63 are energized at the beginning of the movement of the machine whose performance is recorded by the closing of switch 64 in any suitable manner, and thereupon the attraction exerted against gear 61 by the magnet causes said gear to be moved on the pivot 71 and clutched to gear 62 which is then rotated therewith. The accumulating wheel 51 which raises the hour pointer arm 54 through the instrumentality of the spiral slots 52 and the minute pointer arm 56 through the instrumentality of the snail cam 59, is driven by the gear 62. When switch 64 is opened and the magnets 63 de-energized the springs 68 disengage gear 61 from gear 62. The energization of the marker magnets 79 takes place simultaneously with the energization of the magnets 63, these magnets being on the same circuit. When the magnets 79 are energized the marker 30 is rocked against the chart 26. The spring 86 carries it out of contact with the chart as soon as magnets 75 are deënergized. At the end of the day the indicating and recording units are disconnected from the clock driven gears 40 by turning the eccentric 37 which moves the slide 34 outwardly. This brings the contact rods 112 against the contact plate 115 thereby closing the magnet circuit around the switch 64 so that, regardless of the position of the switch, the magnets 63 are energized to clutch gear 62 to gear 61. The hour and minute indicators may thereupon be re-set to zero by turning back knob 43.

In Figs. 15 to 19 inclusive, I have shown a type of indicating unit which is cylindrical in form and in which the actuating mechanisms are quite different in their constructions but operate upon the same general principle as the mechanisms previously described. The general organization of the apparatus is not changed by the change in the construction of the unit. Certain minor modifications in the driving train are, however necessitated which are shown in the drawings and will be described. Each unit is comprised in a casing 122 and the mechanism contained in the casing is driven by a worm gear 123. Preferably the units are arranged in the staggered relation shown in Fig. 15. In this figure, which shows the general organization of the apparatus so far as it is necessary to show it to bring out the differences between this form of apparatus and that shown in the first twelve figures, 40$^b$ designates a fixed gear, 34$^b$ a slide on which the units are mounted, and 41$^b$ a gear meshing with the gear 40$^b$ when the slide 34$^b$ is in its inner position, these parts being exactly the same as the corresponding parts in the previously described apparatus. The worm gears 123 are driven by worm wheels 124 on a pair of shafts 125 which are provided with meshing gears 126 driven from gear 41$^b$ through the interposition of gear 127.

The worm gear 123 of each unit is fixed on the end of a brass spindle 128 which projects through a steel bushing 129 secured by a set screw 130 within the inner sleeve 131 of an electro-magnet 132 of the solenoid type, these parts extending through an insulating block or head 133 which closes the lower end of the casing 122. The spindle 128 is provided with a cross pin 134 the ends of which extend into slots 135 formed in the end of a steel sleeve 136 which terminates at its outer end in a rod 137 on which is mounted a clutch member 138 which is kept from turning on the rod by a pin 139. The rod 137 extends through a bushing 140 secured within a boss 141 formed on the under side of a casing 142 which incloses the mechanisms at the upper end of the unit, the boss 141 having a threaded connection with sleeve 131. Within the casing 142 is a wheel 143 with minute graduations on its perimeter, which are visible through an opening 144 in the casing, and a wheel 145 with hour graduations thereon visible through an opening 146. Bearing balls 147 are interposed between the hour wheel 145 and the inner head 148 of casing 142. Similar bearing balls 149 are interposed between the minute wheel and a gear wheel 150 rigid with the hour wheel 145. The minute wheel is formed on its upper face with a recess 151 providing a clutch face 152 adapted to be engaged by the clutch number 138. A spiral spring 153 is interposed between the end of bushing 140 and the clutch member 138. It will be understood that the train which drives each unit, consisting of gears 40$^b$, 41$^b$, 127, 126, 125, 123, is constantly driven by any suitable mechanism. Spindle 128, sleeve 136 and clutch member 138 are therefore constantly driven whenever the apparatus is in operation. When the circuit of magnet 132 is closed, for example, by the initial operative movements of the machine whose performance is being recorded by the unit in question, the sleeve 136, which constitutes the core of the solenoid 132, is drawn inwardly, bringing the clutch member 138 into contact with the face 152 on the minute wheel 143 and the minute wheel is thereupon revolved.

The hour wheel 145 is rotated the amplitude of one graduation thereon at each complete revolution of the minute wheel by the following mechanism in the nature of a Geneva movement: The inner face 154 of the minute wheel 143 is formed with a notch 155 at the perimeter of the face (Fig. 17) and is provided with a pair of short pins 156 at opposite sides of the notch. Interposed between the minute wheel and the gear 150 on the outer face of the hour wheel 145 is a pinion 157 (Fig. 19) having three full width teeth 158 and three mutilated teeth 159. The pinion is mounted on a stub shaft 160. The inner face of the minute wheel is rabbeted so as to provide a face 161 which as the minute wheel turns slides on a pair of the full width teeth 158 until the notch 155 meets one of these teeth and gives the pinion 157 a one-third revolution. All six teeth of the pinion 157 mesh with the gear wheel 150 (see Fig. 18) so that when the pinion is given a third revolution by the minute wheel it moves the hour wheel a distance equal to two teeth. The gear wheel is provided with twenty-four teeth so that the hour wheel revolves once for every twelve revolutions of the minute wheel.

Figs. 20 and 21 illustrate a modified construction of unit of the same general type as that shown in Figs. 15 to 19 inclusive. The mechanisms are inclosed in a cylindrical casing 162, the upper end of which 163 is provided with hour graduations 164 and minute graduations 165 so as to constitute an indicating dial. The indications are made by a minute hand 166 and an hour hand 167. The minute hand is mounted on a spindle 168 secured to a wheel 169 formed with a recess 170 in its under side providing a clutch face 171 adapted to be engaged by a clutch member 172, a spiral spring 173 being interposed between the wheel and clutch member to normally keep them out of contact with each other. The clutch member 172 is carried on a rod 174 terminating in a magnetizable sleeve 175 formed with slots 176 for a cross pin 177 on a shaft 178 to which a gear wheel 179 is secured adapted to be constantly driven by some suitable form of driving mechanism of the nature of the drive mechanisms heretofore described in connection with the other types of unit. The rod 174 revolves in a bushing 180 and the spindle 178 in a bushing 181 both contained within a sleeve 182 which is surrounded by the coil 183 of an electro-magnet. When the magnet is energized the sleeve 175, which normally stands below the center of the magnet, is raised so as to engage clutch member 72 with the wheel 169. Preferably bearing balls 184 are interposed between the wheel 169 and a block or partition 185 through which spindle 168 extends. The hour hand 167 is carried on the hub 186 of a gear 187 which, with the gears 188, 189 turning on pivot 190 on the block 185 and a gear 191 fixed to the spindle 168, provides a reducing driving train for revolving the hour hand one revolution for each twelve revolutions of the minute hand.

While I have described my invention in certain preferred embodiments, further modifications might be made without departure from the principles of the invention. Therefore I do not wish to be understood as limiting the invention to the precise constructions, arrangements and devices shown except so far as certain of the claims herein are so limited by their express language.

I claim:

1. In apparatus of the character described, the combination with indicating mechanism, of time operated driving mechanism therefor, a friction clutch for connecting the indicating mechanism with the driving mechanism, and means, adapted to be controlled by the machine the performance of which said apparatus indicates, for actuating said clutch.

2. In apparatus of the character described, the combination with indicating mechanism, of continuously operated driving mechanism therefor, each mechanism comprising a gear wheel, said wheels being provided with co-engaging friction clutch faces, and means, adapted to be controlled by the machine the performance of which said apparatus indicates, for actuating said clutch faces.

3. In apparatus of the chaarcter described, the combination with indicating means, of continuously operated driving mechanism therefor each mechanism comprising a gear wheel, said wheels being provided with co-engaging friction clutch faces, electro-magnetic means, adapted to be controlled by the machine the performance of which said apparatus indicates, for bringing said clutch faces into operative engagement, and a spring which normally keeps said clutch faces disengaged.

4. In apparatus of the character described, the combination with indicating mechanism, of time operated driving mechanism therefor comprising respectively a freely revoluble element and an intermittently revoluble element formed with coengaging friction clutch faces and electro-magnetic means, adapted to be controlled by the machine the performance of which said apparatus indicates, for effecting the engagement and disengagement of said clutch faces.

5. In apparatus of the character described, the combination with indicating mechanism, of driving mechanism therefor comprising respectively a freely revoluble element and an intermittently revoluble element formed in coengaging clutch faces, one of which elements is movable in the direction of its axis into engagement with the other, a frame member, an anti-friction thrust bearing introduced between said other revoluble element and the frame member, and electro-magnetic means, adapted to be controlled by the machine the performance of which said apparatus indicates, for effecting the engagement and disengagement of said clutch faces.

6. In apparatus of the character described, the combination with indicating mechanism, of driving mechanism therefor comprising respectively revoluble elements formed with coengaging friction clutch faces, one of which elements is movable in the direction of its axis into engagement with the other, a frame member, an anti-friction thrust bearing introduced between said other revoluble element and the frame member, and electromagnetic means, adapted to be controlled by the machine the performance of which said apparatus indicates, for effecting the engagement and disengagement of said clutch faces.

7. In apparatus of the character described, the combination with indicating mechanism, of driving mechanism therefor comprising respectively revoluble elements formed with coengaging clutch faces, one of which elements is movable in the direction of its axis into engagement with the other, a frame member, an anti-friction thrust bearing introduced between said other revoluble element and the frame member, and means, adapted to be controlled by the machine the performance of which said apparatus indicates, for effecting the engagement and disengagement of said clutch faces.

8. In apparatus of the character described, the combination with indicating mechanism, of driving mechanism therefor comprising respectively revoluble elements formed with coengaging clutch faces, a hollow split pivot on which one of said elements is mounted adapted to exert spring pressure against said element, and means, adapted to be controlled by the machine the performance of which said apparatus indicates, for effecting the engagement and disengagement of said clutch faces.

9. In apparatus of the character described, the combination with indicating mechanism, of driving mechanism therefor comprising respectively revoluble elements formed with coengaging friction clutch faces, a hollow split pivot on which one of said elements is mounted adapted to exert spring pressure against said element, and means, adapted to be controlled by the machine the performance of which said apparatus indicates, for effecting the engagement and disengagement of said clutch faces.

10. In apparatus of the character described, the combination with indicating mechanism, of driving mechanism therefor comprising respectively revoluble elements formed with coengaging clutch faces, a hollow split pivot on which one of said elements is mounted adapted to exert spring pressure against said element, one of said elements being movable in the direction of its axis to and from the other element, a frame member, an anti-friction thrust bearing interposed between the other element and said frame member, and means, adapted to be controlled by the machine the performance of which said apparatus indicates, for effecting the engagement and disengagement of said clutch faces.

11. In apparatus of the character described, the combination with indicating mechanism, of time operated driving mechanism therefor, said mechanisms comprising revoluble elements adapted to be clutched together, one of which is magnetizable and movable toward the other for this purpose, an electro-magnet adapted to draw said magnetizable element into operative relation with the other element, and a spring which disengages said element when the magnet is deënergized.

12. In apparatus of the character described, the combination with indicating mechanism, of time operated driving mechanism therefor, said mechanisms comprising revoluble elements adapted to be clutched together, one of which is magnetizable and movable toward the other for this purpose, electro-magnetic means which operates upon said magnetizable element for effecting the engagement and disengagement of said elements, and a hollow split pivot on which said elements are mounted.

13. In apparatus of the character described, the combination with indicating mechanism, of time operated driving mechanism therefor, said mechanisms comprising revoluble elements adapted to be clutched together, one of which is magnetizable and movable toward the other for this purpose, electromagnetic means which operates upon said magnetizable element for effecting the engagement and disengagement of said elements, a hollow split pivot on which said elements are mounted, a frame member, and an anti-friction thrust bearing interposed between the element, other than the one moved by the magnet, and said frame member.

14. In apparatus of the character described, the combination with indicating mechanism, of driving mechanism therefor, said mechanisms comprising revoluble elements adapted to be clutched together, one of which is magnetizable and movable toward the other for this purpose, electro-magnetic means which operates upon said magnetizable element for effecting the engagement and disengagement of said elements, a hollow split pivot on which said elements are mounted, a frame member, an anti-friction thrust bearing interposed between the element, other than the one moved by the magnet, and said frame member, said pivot on which said revoluble elements are mounted being elastic in its construction so as to exert a breaking pressure on said elements.

15. In apparatus of the character described, an indicating unit comprising continuously movable gear and an intermittently movable gear, one of which is recessed and the other provided with a clutch member adapted to enter said recess, one of said gear wheels being magnetizable and one of said gear wheels being time operated, and an electro-magnet having a pole piece which when said electro-magnet is energized moves said magnetizable gear so as to frictionally clutch the same to the other gear.

16. In apparatus of the character described, an indicating unit comprising continuously movable gear and an intermittently movable gear, one of which is recessed and the other provided with a clutch member adapted to enter said recess, one of said gear wheels being magnetizable and one of said gear wheels being time operated, an electro-magnet having a pole piece which when said electro-magnet is energized moves said magnetizable gear so as to clutch the same to the other gear, and a spring which holds said magnetizable gear out of contact with the other gear when the magnet is deenergized.

17. In apparatus of the character described, an indicating unit comprising continuously movable gear and an intermittently movable gear, one of which is recessed and the other provided with a clutch member adapted to enter said recess, one of said gear wheels being magnetizable and one of said gear wheels being time operated, an electromagnet having a pole piece which, when said electro-magnet is energized, moves said magnetizable gear so as to clutch the same to the other gear, and a pivot for said gears formed so as to provide spring fingers, for the purpose described.

18. In apparatus of the character described, a driving train comprising time operated revoluble elements adapted to be intermittently engaged one with the other, and a pivot on which one of said elements is mounted formed with elastic members which bear against the element mounted thereon.

19. In apparatus of the character described, a driving train comprising time operated revoluble elements adapted to be intermittently engaged one with the other, and a pivot on which one of said elements is mounted which is split so as to provide elastic members bearing upon the element mounted thereon.

20. In apparatus of the character described, the combination with a chart and continuously operated driving mechanism therefor, of a visual indicating mechanism, an electro-magnet for effecting an operative connection between the driving mechanism and the visual indicating mechanism, a marker, and mechanism comprising an electro-magnet in circuit with the first named electro-magnet for bringing said marker into contact with said chart.

21. In apparatus of the character described, the combination with a supporting frame, of driving mechanism thereon comprising means for giving travel to a chart, a plurality of separately removable visual indicating units an electro-magnet for each unit adapted to effect an operative connection between said unit and the driving mechanism, and a plurality of separately removable marking units each comprising an electro-magnet in circuit with the electro-magnet of one of said visual indicating units for operating the same to make a mark on the chart.

22. In apparatus of the character described, the combination with a supporting frame, of a driving mechanism thereon comprising means for giving travel to a chart, a plurality of separately removable visual indicating units, an electro-magnet for each unit adapted to effect an operative connection between said unit and the driving mechanism, and a plurality of separately removable marking units each comprising an electro-magnet for operating the same to make a mark on the chart, the circuits of said magnets being arranged so that when the magnets operating the visual indicating units are energized the magnets operating corresponding marking units will be energized.

23. In apparatus of the character described, the combination with a supporting frame, of driving mechanism thereon comprising means for giving travel to a chart, a plurality of separately removable visual indicating units, an electro-magnet for each unit adapted to effect an operative connection between said unit and the driving mechanism, a plurality of separately removable marking units each comprising an electro-magnet for operating the same to make a mark on the chart, and means comprising coöperating contacts on said units and on said supporting frame for electrically connecting the magnet of each visual indicating unit with the magnet of the corresponding marking unit.

24. In apparatus of the character described, the combination with a supporting frame, of driving mechanism thereon, a plurality of separately removable visual indicating units, a plurality of separately removable marking units one to correspond to each indicating unit, and means for separately actuating said indicating units and simultaneously with each indicating unit, the corresponding marking unit.

25. In apparatus of the character described, the combination with driving mechanism, of a plurality of indicating units comprising, in each case, an indicating mechanism and an electro-magnet for effecting an operative connection between said indicating mechanism and the driving mechanism, said mechanisms being reversible, and means for simultaneously energizing all of said electro-magnets so as to re-set the indicating mechanisms to zero by reversing said driving mechanism.

26. In apparatus of the character described, the combination with a fixed support, of a driving element thereon, a movable support, a driving element on said movable support adapted to mesh with said first named driving element, a plurality of indicating mechanisms on said movable support, an electro-magnet for each of said indicating mechanisms adapted to operatively connect the same with the driving element on the movable support, and means comprising contacts which come together when the movable support is moved away from the fixed support for simultaneously energizing all said magnets so as to permit the re-setting of said indicating mechanisms.

27. In apparatus of the character described, the combination with a fixed support, of a driving element thereon, a movable support, a driving element on said movable support adapted to mesh with said first named driving element, a plurality of indicating mechanisms on said movable support, an electro-magnet for each of said indicating mechanisms adapted to operatively connect the same with the driving element on the movable support, switches for severally closing the circuits of said magnets for the purpose of actuating said indicating mechanisms, a plurality of contact elements on said movable support connected respectively with said electro-magnets, and a contact member against which said contact elements are brought to bear when said movable support is moved away from the fixed support for closing said magnet circuits around the several aforementioned switches for the purpose of re-setting said indicating mechanisms.

28. In apparatus of the character described, the combination with a fixed support, of a driving element thereon, a movable support, a driving element on said movable support adapted to mesh with said first named driving element, a plurality of indicating mechanisms on said movable support, an electro-magnet for each of said indicating mechanisms adapted to operatively connect the same with the driving element on the movable support, switches for severally closing the circuits of said magnets for the purpose of actuating said indicating mechanisms, a plurality of resilient contact elements on said movable support connected respectively with said electro-magnets, and a contact member against which said contact elements are brought to bear when said movable support is moved away from the fixed support for closing said magnetic circuits around the several aforementioned switches for the purpose of re-setting said indicating mechanisms.

29. In apparatus of the character described, a visual indicating unit comprising a substantially cylindrical casing, a solenoid in said casing having a hollow slotted core, a spindle having a telescopic but non-revoluble connection with said core, a minute indicating wheel in said casing having a clutch face, a stem on said solenoid core extending through said minute wheel, a clutch member thereon adapted to engage with the clutch face of the minute wheel, a spring interposed between said clutch member and minute wheel, an hour wheel between the minute wheel and the solenoid, and reducing mechanism for actuating the hour wheel from the minute wheel.

30. In apparatus of the character described, a visual indicating unit comprising a substantially cylindrical casing, a solenoid in said casing having a hollow slotted core, a clutch member on said core, a revoluble element adapted to be engaged by said clutch member, and a stem on said revoluble element extending through the end of the casing, a minute hand on said stem, the end of said casing being formed with graduations providing a dial, a spindle having a telescoping non-revoluble engagement with the core of said solenoid, a spring interposed between said clutch member and said revoluble member, an hour hand, and reducing mechanism between said revoluble member and the hour hand for driving the latter at a reduced speed.

31. In apparatus of the character described, an indicating unit comprising a continuously movable gear and an intermittently movable gear, one of which is magnetizable, and an electromagnet adapted when energized to move said magnetizable gear so as to frictionally clutch the same with the other gear.

32. In apparatus of the character described, an indicating unit comprising a continuously movable gear and an intermittently movable gear, the former of which is magnetizable, and an electromagnet adapted when energized to move said magnetizable gear so as to frictionally clutch the same with the other gear.

33. In apparatus of the character described, the combination with a chart and continuously operated mechanism for driving the same, of a plurality of marking units, a plurality of separately removable visual indicating units, and means for actuating said marker and visual indicating units.

AUSTIN C. JOHNSON.

Witnesses:
G. Y. SKINNER,
R. KUEHN.

---

It is hereby certified that in Letters Patent No. 1,283,789, granted November 5, 1918, upon the application of Austin C. Johnson, of Chicago, Illinois, for an improvement in "Indicating and Recording Mechanisms," errors appear in the printed specification requiring correction as follows: Page 4, line 115, for the reference-numeral "75" read *79;* page 6, line 80, claim 5, for the word "in" read *with;* page 7, line 90, claim 14, for the word "breaking" read *braking;* and that the said Letters Patent should be read with these corrections therein that the same may conform to the record of the case in the Patent Office.

Signed and sealed this 24th day of December, A. D., 1918.

[SEAL.]

F. W. H. CLAY,

*Acting Commissioner of Patents.*